United States Patent [19]

Collins et al.

[11] 4,440,590

[45] Apr. 3, 1984

[54] MANUFACTURE OF SIGNS

[75] Inventors: Ronald B. Collins; Martin E. Dowzall; Brian J. Smith; Geoffrey R. Taylor, all of London, England

[73] Assignee: Letraset Corp.

[21] Appl. No.: 351,939

[22] Filed: Feb. 24, 1982

Related U.S. Application Data

[63] Continuation of Ser. No. 903,770, May 8, 1978, abandoned.

[30] Foreign Application Priority Data

Oct. 4, 1977 [GB] United Kingdom ............... 41245/77

[51] Int. Cl.[3] ........................ B32B 31/00; B41M 5/00; G09F 7/16

[52] U.S. Cl. ...................................... 156/234; 40/595; 156/235; 156/237; 156/240; 156/277; 156/300

[58] Field of Search ............... 156/234, 235, 237, 238, 156/230, 277, 299, 300, 240, 241; 40/594, 595, 615

[56] References Cited

U.S. PATENT DOCUMENTS

| | | | |
|---|---|---|---|
| 2,020,717 | 11/1935 | Ansel, Jr. | 156/240 |
| 2,571,962 | 10/1951 | Smith et al. | 156/238 |
| 2,591,779 | 4/1952 | Buck | 428/138 |
| 3,578,525 | 5/1971 | Mueller | 156/238 |
| 3,607,525 | 9/1971 | Ström | 156/235 |
| 3,660,196 | 5/1972 | Keeling et al. | 156/235 |
| 4,075,049 | 2/1978 | Wood | 156/220 |
| 4,089,722 | 5/1978 | Holoubek | 156/235 |
| 4,145,244 | 3/1979 | Covey | 156/541 |

FOREIGN PATENT DOCUMENTS

| | | |
|---|---|---|
| 133167 | 5/1963 | Argentina . |
| 1293384 | 4/1962 | France . |
| 1351287 | 12/1963 | France . |
| 1449970 | 7/1966 | France . |
| 2332581 | 6/1977 | France . |
| 7215524 | 1/1973 | France . |
| 199623 | 6/1923 | United Kingdom . |
| 383410 | 11/1932 | United Kingdom . |
| 483436 | 4/1938 | United Kingdom . |
| 809138 | 2/1959 | United Kingdom . |
| 954459 | 4/1964 | United Kingdom . |
| 998533 | 7/1965 | United Kingdom . |
| 1195591 | 6/1970 | United Kingdom . |
| 1217915 | 1/1971 | United Kingdom . |
| 1381776 | 1/1975 | United Kingdom . |
| 1388030 | 1/1975 | United Kingdom . |

*Primary Examiner*—William A. Powell
*Assistant Examiner*—Thomas Bokan
*Attorney, Agent, or Firm*—Darby & Darby

[57] ABSTRACT

A method of making a sign is described which comprises taking a transfer material and a temporary support sheet, the transfer material comprising a transparent or translucent carrier sheet bearing on one side a plurality of transferable indicia, which are either sufficiently adhesive as such to enable their transfer to the support sheet or which bear a layer of adhesive on their face remote from the carrier sheet, or which are non adhesive but transferable by virtue of a coating of adhesive on the temporary support sheet, the adhesive if present being adapted to adhere the indicia to the temporary support sheet more strongly than they adhere to the carrier sheet, and wherein the material of the indicia is adhesive under the application of heat and pressure, transferring indicia from the transfer material to the temporary support sheet in the desired order to build up the desired legend for the sign, and applying the transferred indicia under heat and pressure to the surface of a transparent or translucent sheet, e.g. of acrylic plastics, to form the sign. After such transfer the indicia may be overcoated, e.g. with a contrasting color background. The legend is read through the transparent or translucent sheet which protects it against abrasion or other damage.

18 Claims, No Drawings

MANUFACTURE OF SIGNS

This is a continuation, of application Ser. No. 903,770, filed May 8, 1978 now abandoned.

This invention relates to sign manufacture and particularly to sign manufacturing using transfer materials.

Dry transfer lettering materials have been known for many years and are described for example in British Patent Specification Nos. 959,670 and 954,459. Such dry transfer materials conventionally consist of a flexible, transparent or translucent plastics film on which are arranged a plurality of transferable indicia, usually alphabetic letters, numbers and punctuation marks. On top of each indicium is a coating of adhesive which enables the indicium to be transferred from the carrier sheet and adhered to a receptor surface. In order to facilitate such transfer, the relative mechanical characteristics of the indicium and the carrier sheet may be so chosen that the bond between the carrier sheet and the indicium may be weakened or broken by local stretching of the carrier sheet effected by rubbing over the back of the carrier sheet is the region of an indicium with a suitable stylus. This system is described in Specification No. 959,670.

Such dry transfer materials have been used widely for some years in various applications. Because of the relatively fragile nature of the ink film of which the indicia composed, such materials are generally unsuited for the production of signs which may be exposed to the weather, cleaning by detergent solutions or the like and accordingly in the manufacture of signs, where it is desired to use preformed lettering rather than hand-printed lettering, there has been a tendency to use die-cut vinyl lettering rather than dry transfer lettering. Dry transfer lettering may be used in constructing a composite sign where the lettering is overlaid by a protective sheet e.g. the lettering on a suitable carrier such as paper may be inserted in a frame and protected by a glass or plastics cover through which the lettering is visible. Such systems are generally unsatisfactory and tend sometimes to be unsightly.

We have now found that visually much more pleasing signs which have the advantage of high durability may be produced using a special dual-purpose transfer material.

According to the present invention there is provided a method of making a sign which comprises taking a transfer material and a temporary support sheet, the transfer material comprising a transparent or translucent carrier sheet bearing on one side a plurality of transferable indicia, which are either sufficiently adhesive as such to enable their transfer to the support sheet or which bear a layer of adhesive on their face remote from the carrier sheet or which are non adhesive but transferable by virtue of a coating of adhesive on the temporary support sheet, the adhesive if present being adapted to adhere the indicia to the temporary support sheet more strongly than they adhere to the carrier sheet, and wherein the material of the indicia is adhesive under the application of heat and pressure, transferring indicia from the transfer material to the temporary support sheet in the desired order to build up the desired legend for the sign, and applying the transferred indicia under heat and pressure to the surface of a transparent or translucent sheet to form a sign.

The heat and pressure should be sufficient to cause the indicia to adhere to the transparent or translucent sheet more strongly than they are adhered to the temporary support sheet by the sign. The temporary support sheet can then be stripped away and if desired the indicia covered by a layer of suitable material, e.g. paint, which accordingly constitutes a background to the indicia in the sign as viewed. The background may also be provided by a coloured paper or foil adhered over the indicia or held against them. Alternatively, the layer may be provided by transferring a coloured layer from a blocking foil under pressure and, if necessary, heating.

Because, under the action of the heat and pressure, the indicia come into intimate contact with the surface of the transparent or translucent sheet, that surface is totally "wetted" and the indicia appear optically dense and perfectly flat. The indicia in the sign are protected by the transparent or translucent sheet through which they are viewed, which may accordingly be chosen for that purpose. The transparent or translucent sheet may be of glass but is preferably of a plastics material; most preferred are polyvinylchloride, cellulose triacetate and polymethylmethacrylate e.g. those sold under the Registered Trade Marks PERSPEX and PLEXIGLAS.

The property of the indicia that they should be adhesive under the action of heat and pressure may be imparted to the indicia e.g. by constructing them on a basis of a thermoplastic polymeric material which softens to tacky adhesive condition on the application of heat. Alternatively a thermosettable material which likewise softens initially on heating may be used as a base material. In such a case, the finished sign may be rendered exceptionally heat-stable by heating after its manufacture so as to cure the thermosettable base to a hard thermoset film adherent to the transparent or translucent sheet. The indicia may thus be regarded as being formed of a hot melt or heat seal adhesive together with a suitable pigment or dyestuff to render the area of the indicium visible.

Preferably the transfer material used in the method of the present invention is constructed generally as a dry transfer material of the stretch release type i.e. as described in British Patent Specification No. 959,670. The indicia are preferably formed by screen printing using an appropriate printing ink and subsequently the whole printed area of the sheet including the spaces between the indicia is supercoated with a substantially non-tacky pressure sensitive adhesive. The indicia may also be formed, in known fashion, by printing an indicium area in a colourless carrier film and a visible image in coloured ink. The film may be printed by screen printing and the visible image by e.g. gravure, letterpress or lithographic printing, either before or after the film is printed. Substantially non-tacky pressure-sensitive adhesives are generally not particularly strong, and indeed use may have to be made of the stretch release technique mentioned above in order to ensure that a relatively weak adhesive has sufficient pulling power to remove the indicia from the carrier sheet when the dry transfer material is used. The fact that the bond produced by heat and pressure between the indicia and the transparent or translucent sheet through which they are to be viewed is generally very much stronger than the adhesive bond produced by the adhesive of the transfer material or on the temporary support sheet enables the temporary support sheet on to which the indicia were originally transferred when the message or the like was being composed to be peeled away, either hot or cold, to leave the indicia firmly adherent to the transparent or translucent sheet.

The individual components of the preferred dry transfer materials for use in the method of the invention will now be described in detail.

SUPPORT FILM

The support film of the transfer material of the present invention may be any of those conventionally used in the manufacture of dry transfer lettering sheets. Transparent or translucent plastics films are preferred, most preferably polyethylene, styrene/butadiene copolymers, polypropylene and polyethylene terephthalate films. Coated papers may also be used. The thickness of the film is preferably 0.1 to 0.15 mm.

The support film may have a release coating on the surface carrying the indicia.

INDICIA

The indicia may be formed of a printing ink based on a film forming polymeric thermoplastic material. Both plastisol and organosol inks may be used and inks may be used which while based on the thermosetting polymeric materials have an adequate content of modifying agents to give the overall indicia thermoplastic heat seal or hot melt adhesive properties. For example, inks based on nitrocellulose may be given thermoplastic heat seal properties by a suitable choice of plasticiser; polymeric plasticisers, used at a sufficiently high level, impart the desired properties while still enabling the indicia to be printed without difficulty, and enabling the production of dry transfer materials working by so-called "stretch release", as described in British Patent Specification No. 959,670. The indicia may be simply applied by a single printing process or they may be built up in a number of layers, which may vary, and which are applied by successive printing processes. Alternatively, it is possible to produce appropriate indicia photographically by modifying one of the known photographic methods of producing dry transfer materials. Such methods are described inter alia in British Patent Specification Nos. 1,079,661, 1,291,960 and 1,364,627. The melting or softening point of the indicia should be chosen with care and particularly having regard to the types of transparent or translucent sheet on to which the indicia are to be adhered.

ADHESIVE

As noted in the above, the adhesive is preferably of a substantially non-tacky pressure sensitive type. Preferred adhesives consist of a highly tacky polymeric component such as polyisobutylene, polyvinyl ethyl ether, polyvinyl isobutyl ether, or a mixture containing one or more of these together with a tack-modifying or tack-reducing component. Typical tack-reducing components are finely divided mineral materials, particularly finely divided silica and waxy materials such as natural or synthetic waxes.

The formulation of the inks constituting the indicia may be chosen relative to the intended use of the material. For example, if it is desired to use the material in the manufacture of signs which are to consist of a sheet of acrylic plastic through which the indicia are to be viewed, the indicia may be formulated so as to be compatible chemically with the material of the transparent or translucent sheet. Likewise, if the transparent or translucent sheet is of polyvinylchloride, the ink may be chosen to give an ink which is compatible therewith and can be easily heat sealed on to such a surface with visually satisfactory results. Types of plastics sheets which may be used in the manufacture of signs include polymethylmethacrylate sheets of the types noted above, polyvinylchloride sheets, polystyrene sheets, polyethylene and polypropylene sheets, polycarbonate sheets and cellulose triacetate sheets. Suitable materials for the temporary support sheet are plastics films such as polyethylene terephthalate sheet, various treated papers and, for example, aluminium foil. Such temporary support material should of course be able to withstand the heat applied during the step of adhering the indicia to the transparent or translucent sheet under heat and pressure. Likewise, the adhesive forming part of the transfer material of the present invention should not be adversely affected by the heat and pressure used to adhere the indicia to the surface of the transparent or translucent sheet. In particular, the adhesive should not melt at too low a temperature, which would give rise to slippage between indicia and temporary support sheet during the heat transfer step. Particularly preferred adhesives comprise a highly tacky thermoplastic polymeric component together with an appropriate quantity of a finely divided silica to reduce the overall tack of the adhesive.

The adhesive is preferably solvent soluble in a non-solvent for the transparent or translucent sheet. This enables any residues of adhesive to be easily cleaned off the sign, so producing a clean finish. It is particularly important to remove such residues if the indicia are to be overcoated with a sprayed paint coating. In the Examples given below, the adhesives can be dissolved in hexane or heptane.

If an error is made, it is preferable to enable the transferred indicia to be removable either from the temporary support sheet or from the transparent or translucent base sheet by solvent action also. The indicia in the examples below may be removed by dissolving in industrial methylated spirits.

If the transparent or translucent sheet on to which the indicia are to be transferred is very thin, e.g. is a thin plastics foil, that sheet may be backed up during the heat transfer step by a suitable rigid backing.

The following examples will serve to illustrate the invention. In these examples all parts and percentages are by weight unless otherwise stated.

EXAMPLE 1

A printing ink was formulated as follows: A mixture was made up of:

methylmethacrylate copolymer: 20 parts
ethylene glycol ethylether acetate: 68 parts and
polyvinylchloride, polyvinylacetate copolymer (Vinylite VYHH ex. Bakelite): 11 parts 43 parts by weight of this mixture were then triple roll milled together with 9 parts by weight of aniline black pigment, 0.2 parts by weight of fumed silica (Aerosil 300 ex. Degussa) and 3.8 parts by weight ethylene glycol mono ethyl ether acetate. Milling was continued to Hegman Gauge 7.

Thereafter, 24 further parts by weight of the mixture, 10 parts by weight of a 40% by weight solution of methyl methacrylate/butyl methacrylate copolymer (Paraloid B66 ex. Rohm and Hass) in ethylene glycol mono ethyl ether acetate and 10 parts by weight of a methyl methacrylate copolymer solution (40% by weight Paraloid B82 ex. Rohm and Haas in ethylene glycol mono ethyl ether acetate) were added and the mixture stirred to homogeneity.

The black ink so made was used to print letters onto 150 micron thick sheets of high density polyethylene. Silk screen process printing was used, printing being through a 240 mesh screen. The printed images were dried on a belt drier for 30 seconds dwell time at 60° C.

An adhesive was made up as follows:

The following ingredients were stirred together in the proportions by weight given:

- Fumed silica (Aerosil R972 ex. Degussa): 8.0 parts
- Aliphatic hydrocarbon solvent (Exsol 145/160, ex. Esso): 48.0 parts
- Polyisobutylene solution (Low molecular weight Oppanol B10 ex. BASF 30% by weight solids solution in Exsol 145/160): 7.7 parts
- Polyisobutylene solution (High molecular weight Oppanol B50 ex. BASF 20% by weight solution in Exsol 145/160): 20.0 parts
- Polybutene (Low molecular weight Hyvis 10. Ex. B.P. Chemicals Ltd): 13.8 parts The last ingredient was added to the others while hot stirring at 50° to 60° C.

99.0 parts by weight of a 10% by weight solution of polyethylene wax was then added. The polyethylene wax was type ACP6 ex. Allied Chemicals Limited and the solvent was Exsol 145/160.

Finally, a molten 50% by weight solution of a fatty amide (Oleamide, Crodamide 0 ex. Croda Chemicals) in Exsol 145/160 was added and stirring continued to produce a homogeneous adhesive.

This adhesive was applied by screen printing an overall layer through a 240 mesh screen onto the previously printed polyethylene sheets. The adhesive coating was dried by passing the sheets through a belt dryer at a 30 second dwell time at 65° C. The transfer sheets so produced were protected by interleaving with siliconised vegetable parchment paper sheets.

Using the transfer materials so produced in the usual way, a word was built up from individual letters on a 50 micron thick sheet of polyethylene terephthalate film (Melinex ex. I.C.I.). The film bearing the letters was then passed with the letters in contact with a 2 mm sheet of polymethyl methacrylate (Perspex ex. ICI Limited) through a heated nip. The temperature of the nip rolls was 170° C. and the assembly was passed between them at a rate of 4 m/minute.

The polyethylene terephthalate sheet was then peeled away from the polymethyl methacrylate sheet to leave the letters firmly adherent to the surface of th polymethyl methacrylate sheet and the right way round when viewed through that sheet. The side of the sheet bearing the letters was then oversprayed with spray paint to give a sign in which the black letters stood out clearly against the coloured paint background and which had a generally pleasing appearance.

EXAMPLE 2

The following ingredients were mixed together in the following proportions by weight:

- Rutile titanium dioxide (grade R-HD3 ex. British Titan Products): 29 parts
- Copolymer mixture (as in Example 1): 43 parts
- Fumed silica (Aerosil 300 ex. Degussa): 0.2 parts
- Ethylene glycol mono ethyl ether acetate: 7.8 parts This mixture was dispersed on a triple roll mill until a fineness of 7 on a Hegman Gauge was achieved and there was then added 10 parts by weight of a methyl methacrylate/butyl methacrylate copolymer solution (as in Example 1) and 10 parts by weight of a methyl methacrylate copolymer solution (as in Example 1).

Dry transfer sheets were prepared by printing this ink as in Example 1 onto 150 micron thick high density polyethylene sheets and subsequently drying and adhesing those sheets exactly as in Example 1.

Words were made up using these sheets in the usual way by transferring individual letters onto 50 micron polyethylene terephthalate sheets. The sheet bearing the words was then passed together with a 1 mm thick transparent polyvinyl chloride sheet through a heated nip. The nip temperature was 120° C. and the polyethylene terephthalate and PVC sheet were passed through at a speed of 4 m/minute. After passing through the nip, the polethylene terephthalate sheet could be peeled away to leave the white letters adhered to the PVC sheet. The side of the PVC sheet bearing the letters was then sprayed over with black cellulose lacquer and air dried. The resulting sign was of pleasing appearance.

It was found that higher operating speeds could be used in conjunction with higher nip temperatures, for example a nip temperature of 160° C. and a pass speed of 9 m/minute. If high temperatures are used with low speeds, there is a tendency to distortion of the PVC sheet.

EXAMPLE 3

The black ink of Example 1 was used to print indicia on 100 micron high density polyethylene sheets by screen printing using a 61T mesh.

The indicia so printed were overprinted in register using colourless carrier film of the following formulation:

- Fumed silica (Acrosil 130V ex Degussa): 2.8 parts
- Polymeric plasticiser (Uralac 923/68 ex Synthetic Resins Ltd): 30.0 parts
- Monomeric plasticiser (Howflex SP ex Laporte): 3.7 parts
- Ethylene glycol monoethyl ether acetate: 99.5 parts
- Cellulose nitrate (33% DHX 3/5 in butanol): 63.9 parts After each printing, the sheets were belt dried with a 40 second dwell time at 85° C.

The sheets were then overprinted overall with an adhesive of the following formulation:

- Fumed silica (Aerosil 300 ex Degussa): 8.8 parts
- Aliphatic hydrocarbon solvent (ECS 2033 ex Esso): 76.9 parts
- Ethylene glycol monoethyl ether: 26.0 parts
- Xylene: 10.3 parts
- Polyvinyl ethyl ether (low viscosity ex Union Carbide): 16.0 parts
- Polyvinyl ethyl ether (high viscosity ex Union Carbide): 2.0 parts
- Polyterpene resin (A125 ex R. H. Cole Co.) 3.2 parts The adhesive was printed through a 100T mesh and subsequently dried by passing the transfer materials through a belt dryer with a 40 second dwell time at 85° C.

The transfer material so made was used to build up words on 50 micron thick polyethylene terephthalate sheets (Melinex Grade S ex. I.C.I.) and the legend so formed placed in contact with polymethyl methacrylate sheets 2 mm thick. The assembly of polymethyl methacrylate sheet and letter bearing polyethylene terephthalate sheet was then passed through a heated nip. The nip was heated to 180° C. and speed was 8 m/min. The polyethylene terephthalate sheet could then be peeled away to leave the letters firmly adhering to the polymethyl methacrylate sheet.

In order to show up those letters, the polymethyl methacrylate sheet was then backed with a backing of retroreflective material (e.g. Scotchlite ex 3M Company or a microbead-containing paint) to form, when framed, a vehicle identification plate or so-called "numberplate", which was of pleasing appearance and very legible.

EXAMPLE 4

Example 1 was repeated but using white and black inks made up as follows:

First a base medium was made up by mixing together

Poly methyl methacrylate (Plexigum P 24. ex-Cornelius Chemical Co.): 90 parts

Ethylene glycol monoethyl ether acetate: 110 parts

Di ethylene glycol monobutyl ether acetate: 5 parts

Aromatic hydrocarbon fraction boiling between 168°-200° C. (Aromasol H. ex-I.C.I.): 10 parts This base medium was then used to make up ink(s) of the following formulation:

Base medium: 215 parts

Butyl phthallyl butyl glycollate (Reomol 4PG. ex-CIBA-GEIGY): 9 parts

Amide Wax (Dehysol wax): 2.6 parts

Titanium dioxide (Rutile grade RH472 ex-Laporte): 68 parts or Carbon black (Elftex 150 ex-Cabot carbon): 14 parts The ingredients were premixed using a palette knife and then ground on a triple roller mill to Hegman gauge 7 degree of fineness.

The ink(s) thus produced were used as in Examples 1 and 4 for making signs and numberplates; similar satisfactory results were obtained.

If it is desired to use very fine detail indicia, the indicia may be printed in two stages: first a general area is printed using an ink as noted above but not containing pigment to deposit a colourless carrier film. Thereafter, the fine detail indicia are printed on the area with the coloured ink. Alternatively the indicia may be printed first and then overprinted with clear film area. Because the colourless carrier film is based on an acrylic polymer it does not adversely affect the appearance of the finished sign.

EXAMPLE 5

Example 1 was repeated using black and white inks of the following composition, and using an adhesive as set out below:

| White Ink | % |
|---|---|
| Cellulose nitrate (33% n-butanol damped in ethylene glycol monoethyl ether acetate) | 48.3 |
| Polymeric Plasticiser (Paraplex G25 ex Rohm & Haas) | 14.0 |
| Titanium Dioxide | 30.0 |
| Ethylene glycol monoethyl ether (oxitol) | 7.7 |

The ink was triple roll milled to Hegman 7 and the final viscosity was adjusted for printing with oxitol acetate.

| Black Ink | | % |
|---|---|---|
| Cellulose nitrate (33% n-butanol damped in ethylene glycol monoethyl ether acetate) | | 62.5 |
| Polymeric Plasticiser (Pararplex G25 ex Rohm & Haas). | | 16.5 |
| Carbon Black | | 7.5 |
| Ethylene glycol monoethyl ether | | 9.5 |
| Dehysol wax (ex Henkel & Cie GmbH) | flow agents | 2.0 |
| Modaflow (ex Monsanto Chemicals Ltd) | flow agents | 2.0 |

The ink was triple roll milled to Hegman 7 and the final viscosity adjusted for printing with oxitol acetate.

| Adhesive | % |
|---|---|
| Fumed silica (Aerosil R972 ex Degussa) | 4.0 |
| Aliphatic hydrocarbon solvent (Exsol 145/160, ex Esso) | 17.2 |
| Oleamide (Crodamide 'O' ex Croda Chemicals Limited) | 10.12 |
| Polyisobutylene solution (low molecular weight Oppanol B10 ex BASF 50% by weight in Exsol 145/160) | 2.33 |
| Polyisobutylene solution (High molecular weight Oppanol B50 ex BASF 20% by weight in Exsol 145/160) | 10.00 |
| Polybutene (Medium molecular weight Hyvis 30 ex B.P. Chemicals Ltd.) | 6.89 |
| Polyethylene wax solution (Type ACP6 ex Allied Chemicals Ltd. 10% by weight dispersed in Exsol 145/160). | 49.46 |

Similar very satisfactory results were obtained.

We claim:

1. In a method of manufacturing a sign comprising a sign sheet and wherein the indicia of the sign are provided on a preformed transfer material, the improvement which comprises:

providing a dry transfer material comprising a light transmitting carrier sheet bearing on one side a plurality of preformed discrete transferable thermoplastic adhesive ink film indicia, transferring preselected ones of said ink film indicia completely from said carrier sheet to a temporary support sheet in the desired order to build up a predetermined legend for the sign, said transferring step being performed by applying pressure to the rear surface of the carrier sheet in the vicinity of said preselected indicia to create a bond between said preselected indicia and said temporary support sheet greater than the bond between said indicia and said carrier sheet, bringing the transferred ink film indicia on the temporary support sheet into contact with a surface of a light transmitting sign sheet under sufficient heat and pressure to create a bond between said indicia and said sign sheet that is stronger than said bond between said preselected indicia and said temporary support sheet and to cause said transferred indicia to adhere to the sign sheet surface more strongly than to said temporary support, and removing the temporary support sheet, from said ink film indicia to leave said indicia permanently bonded on the sign sheet, said indicia being readable through the sign sheet with no intervening adhesive and said sign sheet protecting said indicia against abrasion.

2. The method of claim 1 wherein the indicia on the transfer material are inherently sufficiently adhesive to enable their transfer to the temporary support sheet.

3. The method of claim 1 wherein the indicia on the dry transfer material each bear a layer of adhesive permitting their transfer to the temporary support sheet.

4. The method of claim 1 wherein the surface of the support sheet on to which the indicia are transferred is provided with a coating of adhesive of sufficient strength to enable transfer of the indicia from the transfer material to the temporary support sheet.

5. Method of claim 1 wherein the sign sheet is transparent.

6. The method of claim 1 wherein the sign sheet is translucent.

7. The method of claim 1 whereinn the sign sheet is of an acrylic plastics material.

8. The method of claim 1 wherein the sign sheet is of polyvinylchloride.

9. The method of claim 1 wherein the sign sheet is of cellulose triacetate.

10. The method of claim 1 wherein the indicia of the transfer material are formed on a basis of a thermoplastic polymeric material which under the action of heat softens to a tacky condition.

11. The method of claim 1 wherein the indicia of the transfer material are formed of a nitrocellulose based ink having a sufficient proportion of polymeric plasticiser to impart to the indicia thermoplastic heat seal properties.

12. The method of claim 1 wherein the temporary support sheet is polyethylene terephthalate foil.

13. The method of claim 1 wherein after removal of the temporary support sheet, the surface of the sign sheet bearing the indicia is coated with a layer of colour contrasting with that of the indicia.

14. The method of claim 1 wherein the indicia are brought into contact with the sign sheet under heat and pressure by passing an assembly of the temporary support sheet, the indicia forming the sign legend and the sign sheet through a heated nip between rollers.

15. The method of manufacturing a sub-surface sign legend which comprises:

providing a dry transfer material comprising a light transmitting carrier sheet bearing a plurality of discrete, spaced apart preformed sign characters on one side, the sign characters having thermoplastic heat seal properties and bearing a layer of adhesive facing away from the carrier sheet, applying pressure to the rear surface of the carrier sheet in the vicinity of preselected sign characters to separately and completely transfer the characters from the carrier sheet to a temporary support sheet to construct the legend for the sign, the adhesive bond between said characters and the temporary support sheet being greater than the adhesive bond between said characters and the carrier sheet, pressing the characters on the support sheet into direct contact with a surface of a light transmitting sign sheet while applying sufficient heat and pressure to create a bond between said indicia and said sign sheet that is stronger than said bond between said characters and said temporary support sheet and cause the thermoplastic characters to adhere more strongly to the sign sheet surface than they are adhered to the temporary support sheet, and separating the temporary support sheet from said characters to leave said characters adhered to said sign sheet in sign legend order.

16. The method of claim 15 wherein the characters are formed from a material which is sufficiently adhesive to enable transfer of the characters from the carrier sheet to the temporary support sheet.

17. The method of making a sub-surface sign which comprises the steps of:

providing a translucent dry transfer carrier sheet having a plurality of thermoplastic indicia thereon, the indicia being further transferable from said carrier sheet to a receiver surface by application of localized pressure, bodily transferring selected ones of the indicia in a preselected sequence to a light transmitting temporary carrier by application of localized pressure only, thereby forming a sign legend on the temporary carrier, bringing a sign sheet having a light transmitting surface into contact with the exposed surface of each of the indicia on the temporary support sheet to form a laminate, and applying sufficient heat and pressure to said laminate to form a bond between the sign sheet surface and the indicia which is stronger than the bond between the indicia and the temporary carrier and to wet the sign sheet surface with said indicia, and thereafter stripping the temporary carrier away from the indicia to leave said sign legend permanently bonded on said sign sheet and readable through said sign sheet with no adhesive between said indicia and said sign sheet.

18. The method of making a subsurface sign which comprises the steps of providing a translucent dry transfer carrier sheet bearing a plurality of thermoplastic indicia thereon, the indicia being transferable from said carrier sheet to a confronting receiving surface by local stretching of the carrier sheet effected by rubbing over the back of the carrier sheet in the region of an indicia with a stylist, transferring selected ones of entire indicia in a preselected sequence to a light transmitting temporary carrier by application of localized pressure only to the rear surface of the carrier sheet in the vicinity of said preselected indicia, thereby forming a sign legend on the temporary carrier, bringing a light transmitting surface into contact with the exposed surface of the indicia on the temporary support sheet, and applying sufficient heat and pressure to said contacting surfaces to form a bond between the sign sheet surface and the indicia which is stronger than the bond between the indicia and the temporary carrier and to cause said indicia to wet the sign sheet surface, and thereafter withdrawing the temporary carrier from the indicia to leave said sign legend on said sign sheet and directly readable through said sign sheet with no intervening adhesive between said indicia and said sign sheet.

* * * * *